(12) United States Patent
Akabori

(10) Patent No.: US 10,082,587 B1
(45) Date of Patent: Sep. 25, 2018

(54) NEUTRON RAY DETECTING SYSTEM, AND METHOD OF SETTING NEUTRON RAY DETECTING SYSTEM

(71) Applicant: SUMITOMO HEAVY INDUSTRIES, LTD., Tokyo (JP)

(72) Inventor: Kiyotaka Akabori, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/901,548

(22) Filed: Feb. 21, 2018

(30) Foreign Application Priority Data

Mar. 2, 2017 (JP) .................................. 2017-039492

(51) Int. Cl.
 G01T 1/20 (2006.01)
 G01T 3/06 (2006.01)
 G01T 7/00 (2006.01)

(52) U.S. Cl.
 CPC . *G01T 3/06* (2013.01); *G01T 7/00* (2013.01)

(58) Field of Classification Search
 CPC ............ G01T 1/1642; G01T 3/06; G01T 1/17
 See application file for complete search history.

(56) References Cited

U.S. PATENT DOCUMENTS

| 4,617,167 | A | 10/1986 | Kruse et al. | |
| 7,394,381 | B2 | 7/2008 | Hanson et al. | |
| 9,720,102 | B1 * | 8/2017 | Page | G01T 1/2002 |
| 2009/0140150 | A1 * | 6/2009 | Ivan | G01T 1/1642 |
| | | | | 250/361 R |

(Continued)

FOREIGN PATENT DOCUMENTS

| EP | 3 040 739 A1 | 3/2015 |
| EP | 3 006 961 A1 | 4/2016 |

(Continued)

OTHER PUBLICATIONS

Search Report issued in European Application No. 18155924.6, dated Jul. 25, 2018.

*Primary Examiner* — Kiho Kim
(74) *Attorney, Agent, or Firm* — Michael Best & Friedrich LLP

(57) ABSTRACT

By acquiring the neutron ray wave height distribution of the neutron rays and the gamma ray wave height distribution of only the gamma rays included in the radiant rays, how much gamma rays are detected as noise can be ascertained in a case where a certain determination threshold value $Q_{th}$ is set. That is, a relationship between the determination threshold value $Q_{th}$ and detection accuracy can be ascertained. Since the distributions are acquired on the basis of two measurements in a case where a filter that cuts the neutron rays N is used and in a case where the filter is not used, the relationship between the determination threshold value $Q_{th}$ and the detection accuracy can be accurately ascertained. Therefore, a determination threshold value adjusting unit can adjust a suitable determination threshold value $Q_{th}$ in conformity with demanded detection accuracy on the basis of the distributions.

6 Claims, 7 Drawing Sheets

(56) References Cited

U.S. PATENT DOCUMENTS

| | | | | |
|---|---|---|---|---|
| 2011/0096886 A1* | 4/2011 | Kang | ............... | G01V 5/0091 |
| | | | | 376/154 |
| 2012/0126127 A1* | 5/2012 | Duraj | ............... | G01T 1/1647 |
| | | | | 250/369 |
| 2012/0132823 A1* | 5/2012 | Menge | ............... | G01T 3/06 |
| | | | | 250/390.11 |
| 2012/0317791 A1* | 12/2012 | Frank | ............... | G01T 3/00 |
| | | | | 29/592.1 |
| 2013/0206996 A1* | 8/2013 | Watanabe | ............... | G01T 3/06 |
| | | | | 250/390.11 |
| 2014/0042330 A1* | 2/2014 | Gozani | ............... | G01T 1/203 |
| | | | | 250/367 |
| 2016/0202363 A1* | 7/2016 | Fukuda | ............... | G01T 3/06 |
| | | | | 250/367 |
| 2016/0291196 A1* | 10/2016 | De Vita | ............... | G01T 1/20 |
| 2017/0343684 A1* | 11/2017 | Iwatschenko-Borho | ............... | G01T 3/065 |

FOREIGN PATENT DOCUMENTS

| | | |
|---|---|---|
| JP | 2001-304974 | 10/2001 |
| WO | WO-2014/192321 A1 | 12/2014 |

\* cited by examiner

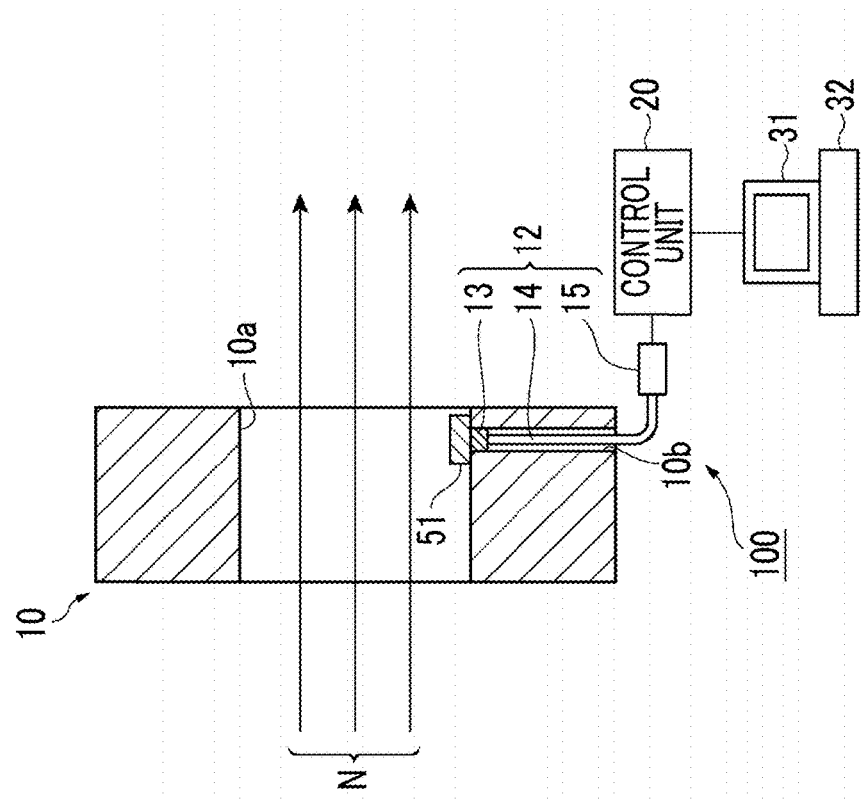
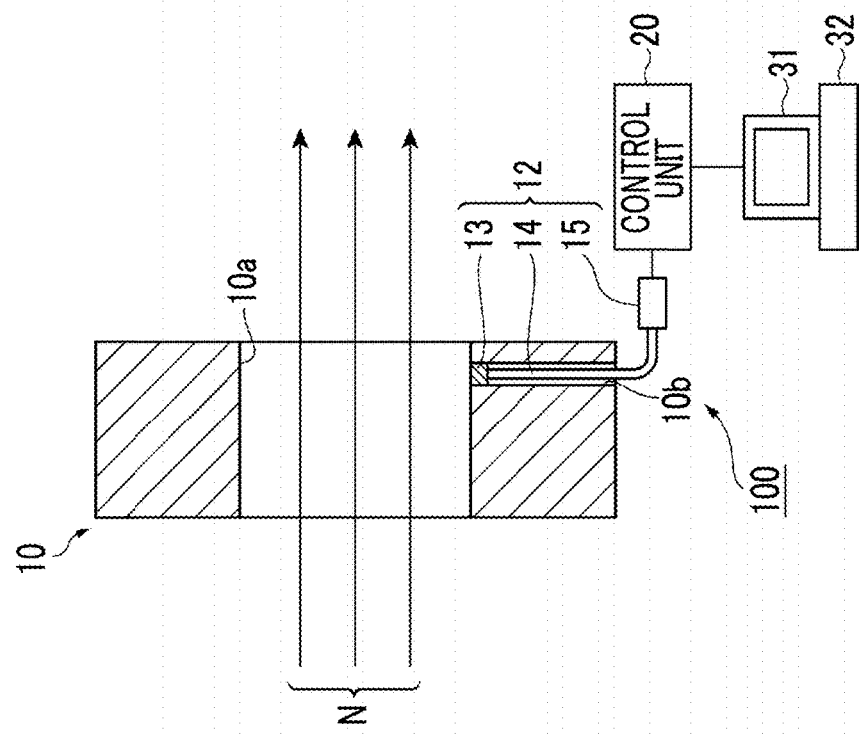

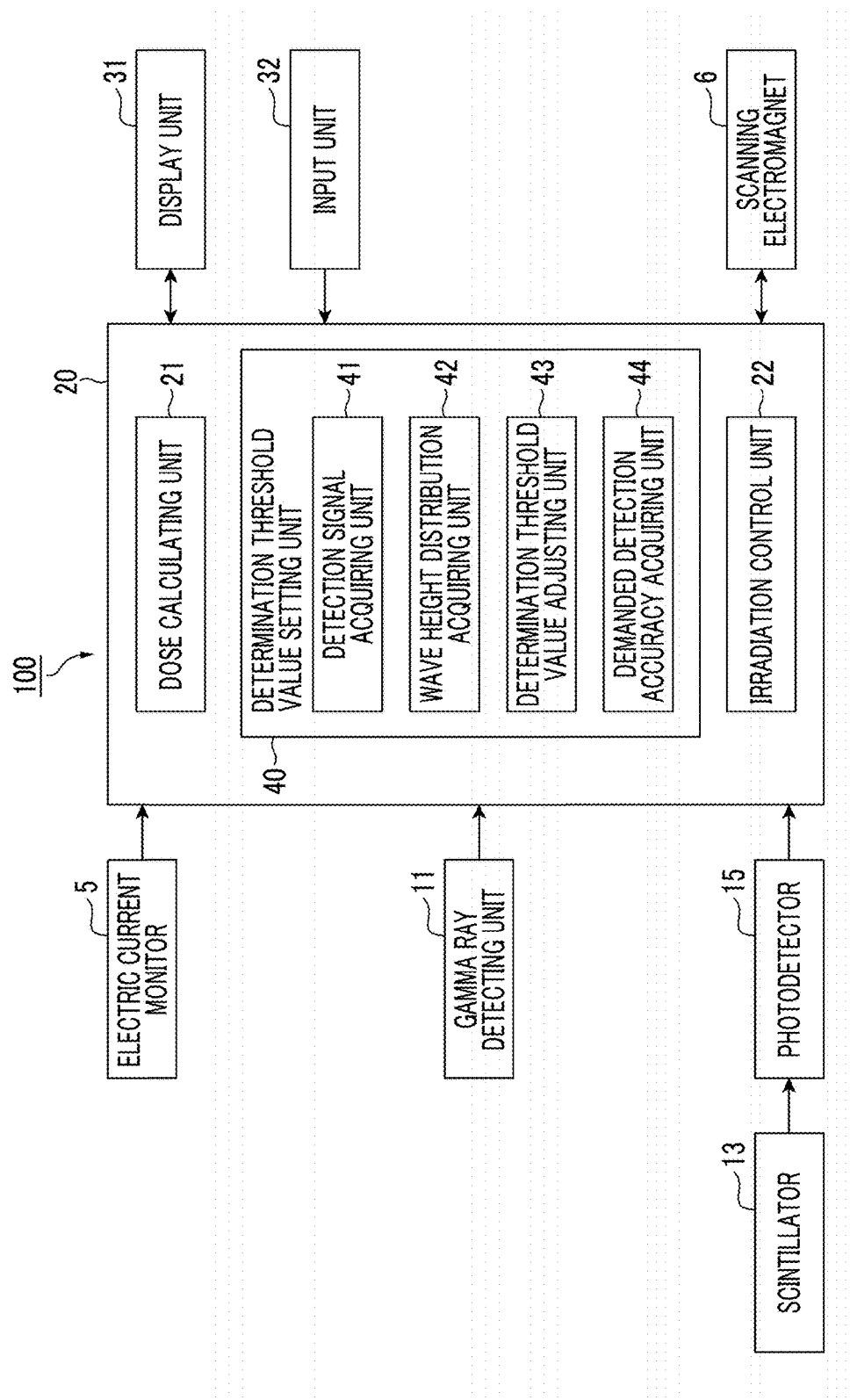

FIG. 7

| a | $Q_{th}$ | DETECTION ACCURACY |
|---|---|---|
| 4 | 1278 | 14.9% |
| 3.8 | 1489 | 10.4% |
| 3.6 | 1700 | 7.3% |
| 3.4 | 1911 | 5.2% |
| 3.2 | 2122 | 3.8% |
| 3 | 2333 | 2.9% |
| 2 | 3388 | 1.0% |
| 1 | 4443 | 0.7% |

NEUTRON RAY DETECTING SYSTEM, AND METHOD OF SETTING NEUTRON RAY DETECTING SYSTEM

RELATED APPLICATIONS

Priority is claimed to Japanese Patent Application No. 2017-039492, filed Mar. 2, 2017, the entire content of which is incorporated herein by reference.

BACKGROUND

Technical Field

Certain embodiments of the present invention relate to a neutron ray detecting system, and a method of setting a neutron ray detecting system.

Description of Related Art

As a technique for discriminating neutron rays and gamma rays from each other, there is a technique described in the related art. In a system disclosed in the related art, a signal based on the neutron rays and a signal based on the gamma rays are discriminated from each other from the waveform of the detected signals. Additionally, this system sets a predetermined determination threshold value, and adopts a detection signal of which the wave height exceeds a determination threshold value among the detected signals, as the signal related to the neutron rays.

However, depending on the setting of the determination threshold value, there is a case where the signal of the gamma rays is included among signals of which the wave height exceeds the determination threshold value. That is, since the gamma rays are detected as noise depending on the setting of the determination threshold value, there is a case where sufficient detection accuracy is not obtained. On the other hand, when the detection accuracy is excessively raised, there is a case where the detection efficiency of the neutron rays declines.

SUMMARY

According to one embodiment of the present invention, there is provided a neutron ray detecting system that detects neutron rays. The neutron ray detecting system includes a scintillator that generates light when radiant rays enter the scintillator; an optical fiber that allows the light generated in the scintillator to be transmitted therethrough; a discrimination unit that receives the light transmitted through the optical fiber, and discriminates a detection signal relating to the received light from a signal relating to the neutron rays in a case where a wave height of the detection signal exceeds a determination threshold value; and a determination threshold value setting unit that sets the determination threshold value. The determination threshold value setting unit includes a detection signal acquiring unit that acquires a first detection signal that is the detection signal of the radiant rays that have entered the scintillator via a filter that cuts the neutron rays, and a second detection signal that is the detection signal of the radiant rays that have entered the scintillator without the filter, a wave height distribution acquiring unit that acquires a neutron ray wave height distribution of only the neutron rays and a gamma ray wave height distribution of only the gamma rays included in the radiant ray, on the basis of a difference between a wave height distribution based on the first detection signal, and a wave height distribution based on the second detection signal, and a determination threshold value adjusting unit that adjusts the determination threshold value on the basis of the neutron ray wave height distribution and the gamma ray wave height distribution.

According to another embodiment of the present invention, there is provided a method of setting a neutron ray detecting system that detects neutron rays. The neutron ray detecting system includes a scintillator that generates light when radiant rays enter the scintillator, an optical fiber that allows the light generated in the scintillator to be transmitted therethrough, and a discrimination unit that receives the light transmitted through the optical fiber, and discriminates a detection signal relating to the received light from a signal relating to the neutron rays in a case where a wave height of the detection signal exceeds a determination threshold value. The setting method includes a detection signal acquiring process of acquiring a first detection signal that is the detection signal of the radiant rays that have entered the scintillator via a filter that cuts the neutron rays, and a second detection signal that is the detection signal of the radiant rays that have entered the scintillator without the filter; a wave height distribution acquiring process of acquiring a neutron ray wave height distribution of only the neutron rays and a gamma ray wave height distribution of only the gamma rays included in the radiant rays on the basis of a difference between the first detection signal and the second detection signal; and a determination threshold value adjusting process of adjusting the determination threshold value on the basis of the neutron ray wave height distribution and the gamma ray wave height distribution.

According to still another embodiment of the present invention, there is provided a neutron ray detecting system that detects neutron rays. The neutron ray detecting system includes a scintillator that generates light when radiant rays enter the scintillator; an optical fiber that allows the light generated in the scintillator to be transmitted therethrough; a discrimination unit that receives the light transmitted through the optical fiber, and discriminates a detection signal relating to the received light from a signal relating to the neutron rays in a case where a wave height of the detection signal exceeds a determination threshold value; a display unit that displays information; and a determination threshold value setting unit that sets the determination threshold value. The display unit displays a notification for guiding input of a detection accuracy, and displays, after the determination threshold value setting unit sets the determination threshold value on the basis of the input detection accuracy, the set determination threshold value.

BRIEF DESCRIPTION OF THE DRAWINGS

FIGS. 2A and 2B are sectional views illustrating a neutron ray detector provided at a collimator.

FIG. 3 is a block diagram illustrating a control unit of the neutron capture therapy apparatus.

FIG. 7 is a table illustrating an example of a relationship between a determination threshold value and detection accuracy.

DETAILED DESCRIPTION

Figure 1:
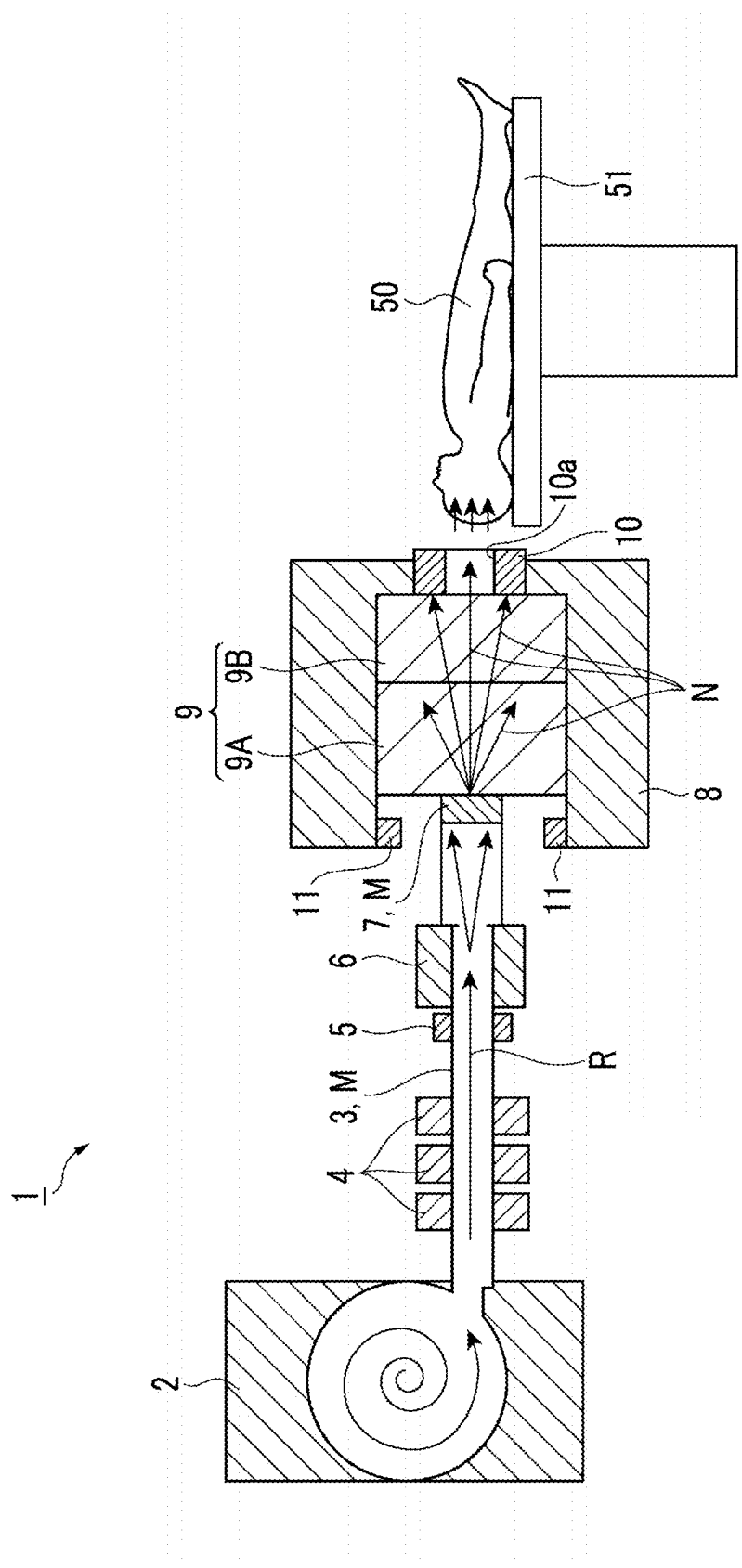
FIG. 1 is a schematic view illustrating a neutron capture therapy apparatus including a neutron ray detecting system of one embodiment of the invention.

It is desirable to provide a neutron ray detecting system and a method of setting a neutron ray detecting system that can set a determination threshold value to a suitable value.

In this neutron ray detecting system, in a case where the wave height of the detection signal relating to the received light from the scintillator exceeds the determination threshold value, the discrimination unit discriminates the detection signal from the signal related to the neutron rays. The determination threshold value setting unit that sets such a determination threshold value includes the detection signal acquiring unit that acquires the first detection signal that is the detection signal of the radiant rays that have entered the scintillator via the filter that cuts the neutron rays, and the second detection signal that is the detection signal of the radiant rays that have entered the scintillator without the filter. Additionally, the determination threshold value setting unit includes the wave height distribution acquiring unit that acquires the neutron ray wave height distribution of the neutron rays and the gamma ray wave height distribution of only the gamma rays included in the radiant rays on the basis of the difference between the wave height distribution based on the first detection signal and the wave height distribution based on the second detection signal. In this way, by acquiring the neutron ray wave height distribution of the neutron rays and the gamma ray wave height distribution of only the gamma rays included in the radiant rays, how much gamma rays are detected as noise can be ascertained in a case where a certain determination threshold value is set. That is, the relationship between the determination threshold value and the detection accuracy can be ascertained. Additionally, since the neutron ray wave height distribution and the gamma ray wave height distribution are acquired on the basis of two measurements in a case where the filter that cuts the neutron rays is used and in a case where the filter is not used, the relationship between the determination threshold value and the detection accuracy can be accurately ascertained. Therefore, the determination threshold value adjusting unit can adjust a suitable determination threshold value in conformity with the demanded detection accuracy on the basis of the neutron ray wave height distribution and the gamma ray wave height distribution. From the above, the determination threshold value can be set to a suitable value.

In the neutron ray detecting system, the determination threshold value setting unit may further include a demanded detection accuracy acquiring unit that acquires a demanded detection accuracy, and the determination threshold value adjusting unit may compare an amount of the gamma rays of which a wave height exceeds the determination threshold value with the detection accuracy acquired by the demanded detection accuracy acquiring unit, thereby adjusting the determination threshold value. Accordingly, the determination threshold value adjusting unit can adjust the determination threshold value that matches the detection accuracy demanded from a user.

In the neutron ray detecting system, the wave height distribution acquiring unit may acquire the neutron ray wave height distribution and the gamma ray wave height distribution in consideration of a difference between a radiation amount of the radiant rays when acquiring the first detection signal and a radiation amount of the radiant rays when acquiring the second detection signal. In this way, the neutron ray wave height distribution and the gamma ray wave height distribution can be more accurately acquired by taking into consideration the difference in the radiation amounts of the radiant rays between the two measurements in the case where the filter that cuts the neutron rays is used and in the case where the filter is not used.

The neutron ray detecting system may further include an irradiation control unit that controls a radiation amount of the radiant rays, and the irradiation control unit may make a radiation amount of the radiant rays when acquiring the first detection signal, and a radiation amount of the radiant rays when acquiring the second detection signal equal to each other. In this way, the neutron ray wave height distribution and the gamma ray wave height distribution can be more accurately acquired by making the radiation amounts of the radiant rays between the two measurements in the case where the filter that cuts the neutron rays is used and in the case where the filter is not used equal to each other.

According to the method of setting the neutron ray detecting system, the same working effects as the above-described neutron ray detecting system can be obtained.

According to the neutron ray detecting system, a user can know the determination threshold value, which is set by the determination threshold value setting unit on the basis of the detection accuracy, through the display of the display unit, when the detection accuracy is input in accordance with the display of the display unit. Accordingly, the user can detect the neutron rays with a suitable determination threshold value according to the demanded detection accuracy.

According to the invention, it is possible to provide the neutron ray detecting system and the method of setting a neutron ray detecting system that can set the determination threshold value to a suitable value.

Hereinafter, preferred embodiments of the invention will be described in detail with reference to the drawings.

A neutron capture therapy apparatus 1 illustrated in FIG. 1 is an apparatus that performs cancer treatment using boron neutron capture therapy (BNCT). In the neutron capture therapy apparatus 1, for example, a tumor of a patient (irradiated body) 50 to which boron ($^{10}$B) has been administered is irradiated with neutron rays N.

The neutron capture therapy apparatus 1 includes a cyclotron 2. The cyclotron 2 is an accelerator that accelerates charged particles, such as anions, to produce a charged particle beam R. In the present embodiment, the charged particle beam R is a proton beam generated by stripping electric charges from anions. The cyclotron 2 has, for example, the capability of producing a charged particle beam R having a beam radius of 40 mm and 60 kW (=30 MeV×2 mA). In addition, the accelerator is not limited to the cyclotron, and may be a synchrotron, a synchro-cyclotron, a linac, or the like.

The charged particle beam R emitted from the cyclotron 2 is sent to a neutron ray generating unit M. The neutron ray generating unit M is composed of a beam duct 3 and a target 7. The charged particle beam R emitted from the cyclotron 2 passes through the beam duct 3, and proceeds toward the target 7 disposed at an end part of the beam duct 3. A plurality of four-pole electromagnets 4, an electric current monitor 5, and a scanning electromagnet 6 are provided along the beam duct 3. The plurality of four-pole electromagnets 4, for example, adjusts the beam axis of the charged particle beam R, using the electromagnets.

The electric current monitor 5 detects the current value (that is, electric charges, an irradiation dose rate) of the charged particle beam R radiated to the target 7 in real time. As the electric current monitor 5, a non-destructive DC current transformer (DCCT) capable of performing current measurement without influencing the charged particle beam R is used. The electric current monitor 5 outputs a detection result to a control unit 20 to be described below. In addition, the "dose rate" means dose per unit time.

Specifically, in order to accurately detect the current value of the charged particle beam R to be radiated to the target 7, the electric current monitor 5 is provided immediately in front of the scanning electromagnet 6 downstream of the four-pole electromagnets 4 (downstream of the charged particle beam R) so as to eliminate the influence of the four-pole electromagnets 4. That is, since the scanning electromagnet 6 scans the target 7 such that the charged particle beam R is not always radiated to the same position, a large-sized electric current monitor 5 is required for disposing the electric current monitor 5 downstream of the scanning electromagnet 6. In contrast, the electric current monitor 5 can be downsized by providing the electric current monitor 5 upstream of the scanning electromagnet 6.

The scanning electromagnet 6 performs scanning with the charged particle beam R, and controls the radiation of the charged particle beam R to the target 7. The scanning electromagnet 6 controls the position of radiation of the charged particle beam R to the target 7.

By irradiating the target 7 with the charged particle beam R, the neutron capture therapy apparatus 1 generates the neutron rays N and emits the neutron rays N toward a patient 50. The neutron capture therapy apparatus 1 includes the target 7, a shielding member 9, a moderator 8, a collimator 10, and a gamma ray detecting unit 11.

Additionally, the neutron capture therapy apparatus 1 includes the control unit 20 (refer to FIGS. 2A, 2B and 3). The control unit 20 is constituted of a central processing unit (CPU), a read-only memory (ROM), a random access memory (RAM), and the like, and is an electronic control unit that comprehensively controls the neutron capture therapy apparatus 1. The detailed configuration of the control unit 20 will be described below.

The target 7 generates the neutron rays N by being irradiated with the charged particle beam R. The target 7 herein is formed of, for example, beryllium (Be), lithium (Li), tantalum (Ta), and tungsten (W), and forms a disk shape with a diameter of, for example, 160 mm. In addition, the target 7 is not limited to having the disk shape and may have other shapes. Additionally, the target 7 is not limited to being in a solid state and may be a liquid state.

The moderator 8 decelerates the energy of the neutron rays N generated in the target 7. The moderator 8 has a laminated structure composed of a first moderator 8A that mainly decelerates fast neutrons included in the neutron rays N, and a second moderator 8B that mainly decelerates epithermal neutrons included in the neutron rays N.

The shielding member 9 shields the generated neutron rays N, gamma rays produced by the generation of the neutron rays N, and the like so as not to be emitted to the outside. The shielding member 9 is provided so as to surround the moderator 8. An upper part and a lower part of the shielding member 9 extend further to the upstream side of the charged particle beam R than the moderator 8, and the gamma ray detecting unit 11 is provided in these extending parts.

The collimator 10 shapes the radiation field of the neutron rays N, and has an opening 10a through which the neutron rays N pass. The collimator 10 is, for example, a block-shaped member having the opening 10a at the center thereof.

The gamma ray detecting unit 11 detects gamma rays, which are generated from the neutron ray generating unit M by the radiation of the charged particle beam R, in real time. As the gamma ray detecting unit 11, a scintillator, an ionization chamber, and other various gamma ray detecting devices can be adopted. In the present embodiment, the gamma ray detecting unit 11 is provided closer to the upstream side of the charged particle beam R than the moderator 8 around the target 7.

The gamma ray detecting unit 11 is disposed inside each of the upper part and the lower part of the shielding member 9 that extend to the upstream side of the charged particle beam R. In addition, the number of gamma ray detecting units 11 is not particularly limited, and may be one or may be three or more. When three or more gamma ray detecting units 11 are provided, the gamma ray detecting units may be provided at predetermined intervals so as to surround an outer periphery of the target 7. The gamma ray detecting unit 11 outputs a detection result of the gamma rays to the control unit 20. A configuration not including the gamma ray detecting unit 11 may be used.

Next, the configuration of a neutron ray detecting system 100 related to the present embodiment will be described with reference to FIGS. 2A, 2B and 3.

As illustrated in FIGS. 2A and 2B, the neutron ray detecting system 100 includes a neutron ray detector 12, the control unit 20, a display unit 31, and an input unit 32.

The collimator 10 is provided with the neutron ray detector 12 for detecting the neutron rays N, which passes through the opening 10a of the collimator 10, in real time. At least a portion of the neutron ray detector 12 is provided in a through-hole 10b (a through-hole formed in a direction orthogonal to the opening 10a) that is formed in the collimator 10. The neutron ray detector 12 has a scintillator 13, an optical fiber 14, and a photodetector 15.

The scintillator 13 is a fluorescent body that converts entered radiant rays (the neutron rays N, gamma rays) into light. In the scintillator 13, internal crystals are brought into an excited state in accordance with the dose of entered radiant rays, and generates scintillation light. The scintillator 13 is provided within the through-hole 10b of the collimator 10, and is exposed to the opening 10a of the collimator 10. The scintillator 13 emits light as the neutron rays N or gamma rays within the opening 10a enter the scintillator 13. A $^6$Li glass scintillator, an LiCAF scintillator, a plastic scintillator coated with $^6$LiF, a $^6$LiF/ZnS scintillator, or the like can be adopted as the scintillator 13.

The optical fiber 14 is a member that allows the light generated in the scintillator 13 to be transmitted therethrough. The optical fiber 14 is constituted of, for example, a bundle of flexible optical fiber, or the like. The photodetector 15 detects the light transmitted through the optical fiber 14. As the photodetector 15, for example, various kinds of photodetectors, such as a photomultiplier tube and a photoelectric tube, can be adopted. The photodetector 15 outputs an electrical signal (detection signal) to the control unit 20 at the time of light detection.

The display unit 31 is a device that displays various kinds of information to a user. A display or the like is adopted as the display unit 31. In a case where there is information intended to be input by a user, the display unit 31 displays a notification for guiding the user to input the information. For example, the display unit 31 displays a notification for guiding the user to input the demanded detection accuracy of neutron rays. Additionally, the display unit 31 receives the input to display a result calculated by the control unit 20. For example, after the control unit 20 sets a determination threshold value on the basis of the input detection accuracy, the display unit 31 displays the determination threshold value. The input unit 32 is a device in which various kinds of input from a user is made. The input unit 32 is constituted of a keyboard, a mouse, a touch screen, or the like.

As illustrated in FIG. 3, the control unit 20 has a dose calculating unit 21, an irradiation control unit 22, and a determination threshold value setting unit 40. The control unit 20 is electrically connected to the electric current monitor 5, the scanning electromagnet 6, the gamma ray detecting unit 11 and the photodetector 15 (neutron ray detector 12), the display unit 31, and the input unit 32.

The dose calculating unit 21 measures (calculates) the dose of the charged particle beam R radiated to the target 7 in real time on the basis of a detection result of the current value of the charged particle beam R by the electric current monitor 5. The dose calculating unit 21 sequentially integrates the current value of the measured charged particle beam R with respect to time, and calculates the dose of the charged particle beam R in real time.

Additionally, the dose calculating unit 21 measures (calculates) the dose of the gamma rays in real time on the basis of the detection result of the gamma rays by the gamma ray detecting unit 11.

Moreover, the dose calculating unit 21 measures (calculates) the dose of the neutron rays N passing through the opening 10a of the collimator 10 on the basis of a detection result of the neutron rays N by the neutron ray detector 12. The dose calculating unit 21 receives the detection signal from the photodetector 15, and discriminates a signal relating to the neutron rays and a signal relating to the gamma rays from each other (will be described in detail below). The dose calculating unit 21 constitutes a discrimination unit together with the photodetector 15.

The dose calculating unit 21 comprehensively calculates the dose of the neutron rays N generated in the target 7 in real time on the basis of the calculated dose of the charged particle beam R, the calculated dose of the gamma rays, and the calculated dose of the neutron rays N. A calculation result obtained by the dose calculating unit 21, such as a dose of the neutron rays N, is displayed, for example on the display unit 31.

The irradiation control unit 22 controls the radiation of the charged particle beam R to the target 7 on the basis of the dose of the neutron rays N calculated by the dose calculating unit 21. The irradiation control unit 22 transmits a command signal to the cyclotron 2 and the scanning electromagnet 6 to control the radiation of the charged particle beam R to the target 7, thereby controlling the radiation of the neutron rays N generated from the target 7 to a patient. The irradiation control unit 22 performs the irradiation control of the neutron rays N such that the dose of the neutron rays N calculated by the dose calculating unit 21 conforms to a preset treatment plan.

The dose calculating unit 21 determines whether or not the wave height (light quantity) of detection signals relating to the light received by the photodetector 15 exceeds a determination threshold value $Q_{th}$, and discriminates a detection signal based on the neutron rays N and a detection signal based on the gamma rays from each other. Since the neutron rays N and the gamma rays enter the scintillator 13 as radiant rays, the neutron rays N and the gamma rays are discriminated from each other in accordance with the intensity of light.

The determination threshold value setting unit 40 sets the above-described determination threshold value $Q_{th}$. Here, a determination threshold value calculation formula for obtaining the determination threshold value $Q_{th}$ is expressed as "$Q_{th} = P_N - a\sigma$". "$P_N$" represents a peak based on the neutron rays N. "$\sigma$" represents the standard deviation of the distribution caused by neutrons. "a" represents a coefficient for $\sigma$. That is, the determination threshold value $Q_{th}$ is set based on the neutron rays N to a value lower by $a\sigma$ from the peak $P_N$. Here, a large amount of neutron rays N are included in a region where the wave height is high, in the vicinity of the peak $P_N$, and the gamma rays increase as a region where the wave height is low is approached. Therefore, since the determination threshold value $Q_{th}$ becomes low when a great coefficient a is set, the gamma rays of which the wave height becomes higher than the determination threshold value $Q_{th}$ increase. Accordingly, since the gamma rays are likely to be erroneously discriminated as the neutron rays N, the detection accuracy declines. However, although detection accuracy declines, the number of events that the neutron rays N are detected also increases. Thus, detection efficiency improves. Therefore, since the determination threshold value $Q_{th}$ becomes high when a small coefficient a is set, the gamma rays of which the wave height becomes higher than the determination threshold value $Q_{th}$ decrease. Accordingly, since the gamma rays to be erroneously discriminated as the neutron rays N decrease, the detection accuracy improves. However, although the detection accuracy improves, the number of events of the neutron rays N to be detected itself also decreases. Thus, the detection efficiency declines. As described above, the determination threshold value setting unit 40 sets an optimal determination threshold value $Q_{th}$ by adjusting the coefficient a on the basis of the detection accuracy demanded by a user.

Specifically, the determination threshold value setting unit 40 includes a detection signal acquiring unit 41, a wave height distribution acquiring unit 42, a determination threshold value adjusting unit 43, and a demanded detection accuracy acquiring unit 44.

The detection signal acquiring unit 41 acquires the detection signal from the photodetector 15. Here, in the present embodiment, by performing the radiation of the neutron rays twice when the determination threshold value $Q_{th}$ is set, the detection signal acquiring unit 41 acquires two kinds of detection signals of a first detection signal and a second detection signal. In the first irradiation, the radiation of the neutron rays N is performed in a state where a filter 51 that cuts the neutron rays N is provided so as to cover the scintillator 13 (refer to FIG. 2B). Accordingly, the detection signal acquiring unit 41 acquires the first detection signal that is a detection signal of the radiant rays that have entered the scintillator 13 via the filter 51. In the second irradiation, the radiation of the neutron rays N is performed in a state where the filter 51 is removed (refer to FIG. 2A). Accordingly, the detection signal acquiring unit 41 acquires the second detection signal that is a detection signal of the radiant rays that have entered the scintillator 13 without the filter 51.

It is preferable that the material of the filter 51 is one, which does not emit the gamma rays when absorbing the neutron rays, such as lithium hexafluorides and lithium fluoride. Alternatively, the material of the filter 51 may be one, in which the energy of emitted gamma rays is low, such as cadmium. It is preferable that the thickness of the filter 51 is set to be small enough so as not to strongly absorb the gamma rays.

The wave height distribution acquiring unit 42 acquires the neutron ray wave height distribution of the neutron rays N and the gamma ray wave height distribution of only the gamma rays included in the radiant rays on the basis of a difference between a wave height distribution based on the first detection signal and a wave height distribution based on the second detect ion signal. The wave height distribution acquiring unit 42 acquires the neutron ray wave height distribution and the gamma ray wave height distribution in consideration of a difference between the radiation amount of the radiant rays when acquiring the first detection signal and the radiation amount of the radiant rays when acquiring the second detection signal. A method of acquiring the neutron ray wave height distribution and the gamma ray wave height distribution will be described below in detail.

The determination threshold value adjusting unit 43 adjusts the determination threshold value $Q_{th}$ on the basis of the neutron ray wave height distribution and the gamma ray wave height distribution. The determination threshold value adjusting unit 43 adjusts the determination threshold value $Q_{th}$ by comparing the amount of the gamma rays of which the wave height exceeds the determination threshold value $Q_{th}$ with the detection accuracy acquired by the demanded detection accuracy acquiring unit 44. A method of adjusting the determination threshold value $Q_{th}$ will be described below in detail.

The demanded detection accuracy acquiring unit 44 acquires a demanded detection accuracy in the detection of the neutron rays. The demanded detection accuracy acquiring unit 44 acquires a demanded detection accuracy input by a user in the input unit 32.

Next, a method of setting the determination threshold value $Q_{th}$ of the determination threshold value setting unit 40 will be described with reference to FIGS. 4 to 7. However, the method of setting the determination threshold value $Q_{th}$ is not limited to the following, and may be appropriately changed without departing the concept of the invention.

Figure 4:
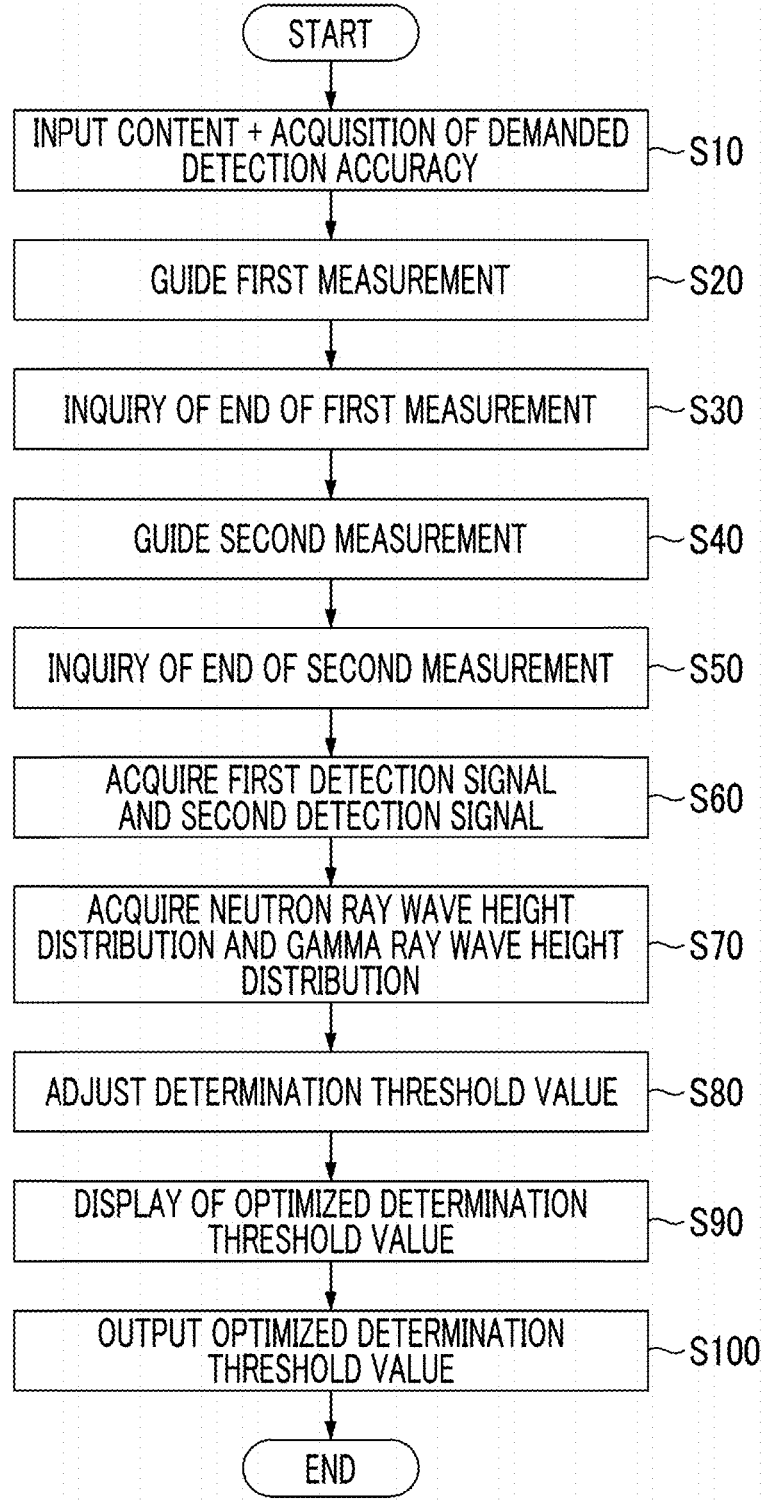
FIG. 4 is a flowchart illustrating the processing contents of a method of setting a determination threshold value.

As illustrated in FIG. 4, the demanded detection accuracy acquiring unit 44 performs the input guide of the demanded detection accuracy and acquires the input detection accuracy (Step S10). In S10, the demanded detection accuracy acquiring unit 44 outputs a signal to the display unit 31, and displays a notification for guiding the input of the demanded detection accuracy on the display unit 31. Additionally, in a case where the demanded detection accuracy is input via the input unit 32 by a user, the demanded detection accuracy acquiring unit 44 acquires the demanded detection accuracy.

Next, the detection signal acquiring unit 41 guides the user so as to perform first measurement in order to acquire the first detection signal (Step S20). In S20, the display unit 31 displays the guide for performing the first measurement. Accordingly, as illustrated in FIG. 2B, the user performs the radiation of the neutron rays N in a state where the scintillator 13 is covered with the filter 51 that cuts the neutron rays N. After the elapse of a predetermined time, the detection signal acquiring unit 41 inquires whether or not the first measurement has ended (Step S30). In S30, the display unit 31 displays a message inquiring whether or not the first measurement has ended. In a case where the first measurement has ended, the user performs the input of a message, showing that the measurement has ended, to the input unit 32.

Next, the detection signal acquiring unit 41 guides the user so as to perform second measurement in order to acquire the second detection signal (Step S40). In S40, the display unit 31 displays the guide for performing the second measurement. Accordingly, as illustrated in FIG. 2A, the user performs the radiation of the neutron rays N in a state where the filter 51 is detached from the scintillator 13. After the elapse of a predetermined time, the detection signal acquiring unit 41 inquires whether or not the second measurement has ended (Step S50). In S50, the display unit 31 displays a message inquiring whether or not the second measurement has ended. In a case where the second measurement has ended, the user performs the input of a message, showing that the measurement has ended, to the input unit 32. In addition, either of the measurement for acquiring the first detection signal or the measurement for acquiring the second detection signal may be performed first.

Next, the detection signal acquiring unit 41 detects the first detection signal obtained by the first measurement performed between S20 and 30, and acquires the second detection signal obtained by the second measurement performed between S40 and 50) (Step S60: detection signal acquiring process). Accordingly, the detection signal acquiring unit 41 calculates the wave height of the first detection signal in which the neutron rays N are cut by the filter 51, thereby acquiring a curve line of wave height distribution illustrated, for example by "$f_{LiF}$" of FIG. 5. The detection signal acquiring unit 41 acquires a curve line of wave height distribution illustrated, for example by "$f_{normal}$" of FIG. 5, thereby calculating the wave height of the second detection signal in which the neutron rays N are not cut by the filter 51.

Next, the wave height distribution acquiring unit 42 acquires the neutron ray wave height distribution and the gamma ray wave height distribution (Step S70: wave height distribution acquiring process). In S70, the wave height distribution acquiring unit 42 acquires the neutron ray wave height distribution and the gamma ray wave height distribution on the basis of a difference between the wave height distribution $f_{LiF}$ based on the first detection signal acquired in S60, and the wave height distribution $f_{normal}$ based on the second detection signal. Additionally, in S70, the wave height distribution acquiring unit 42 acquires the neutron ray wave height distribution and the gamma ray wave height distribution in consideration of the difference between the radiation amount of the radiant rays when acquiring the first detection signal and the radiation amount of the radiant rays when acquiring the second detection signal.

Figure 5:
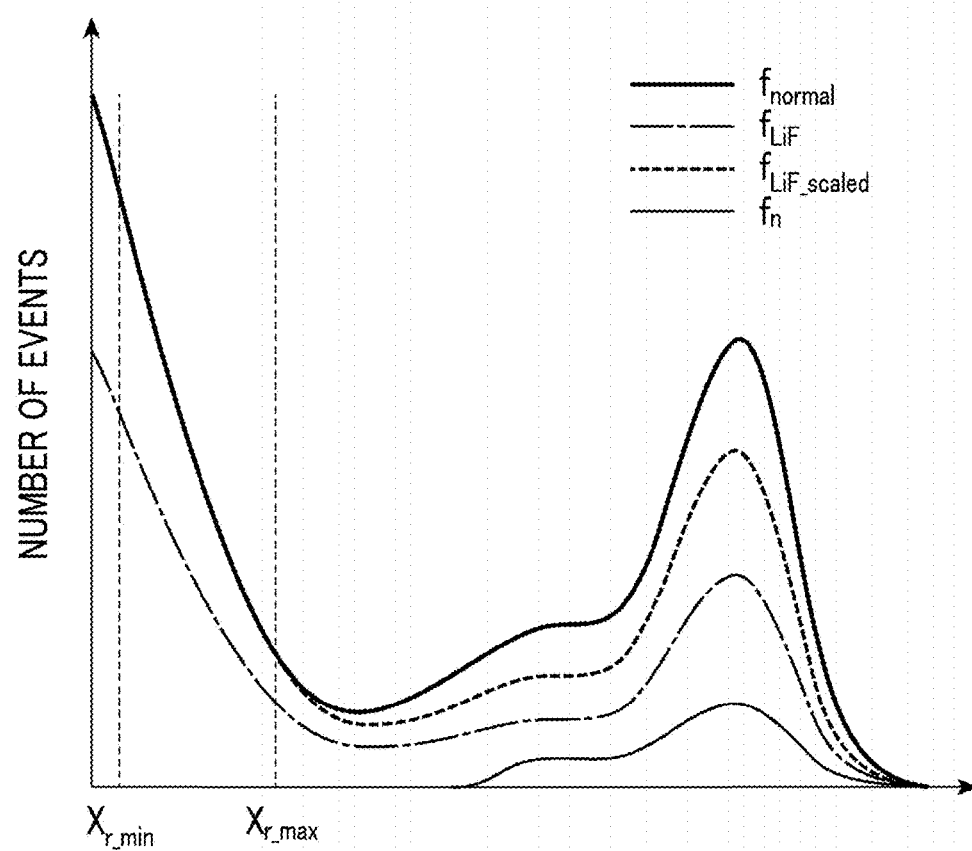
FIG. 5 is a graph illustrating a relationship between wave height distribution and counting used for adjustment of the determination threshold value.

Specifically, the wave height distribution acquiring unit 42 extracts a region where only the gamma rays are included from the wave height distribution $f_{normal}$ and sets "$x_{\gamma\_min}$-$x_{\gamma\_max}$" as a range of the wave height of the region (refer to FIG. 5). Next, the wave height distribution acquiring unit 42 defines a formula shown in the following Formula (1), and obtains $\alpha$ ($=\alpha_{opt}$) that minimizes d (by iteration. Here, "$f_{LiF\_scaled}=(opt \cdot f_{LiF})$" is defined. Such wave height distribution $f_{LiF\_scaled}$ is obtained by processing the wave height distribution $f_{LiF}$ such that the radiation amount of the radiant rayradiation amount of the radiant rays when acquiring the first detection signal matches the radiation amount of the radiant rayradiation amount of the radiant rays when acquiring the second detection signal. Therefore, the wave height distribution acquiring unit 42 obtains a difference between the wave height distribution $f_{normal}$ and the wave height distribution $f_{LiF\_}$scaled, thereby acquiring neutron ray wave height distribution fn, which is the wave height distribution of only the neutron rays (refer to FIG. 5).

[Formula 1]

$$d_\gamma = \int_{x_{\gamma\_min}}^{x_{\gamma\_max}} (f_{normal} - \alpha \cdot f_{LiF}) dx \quad (1)$$

Figure 6:
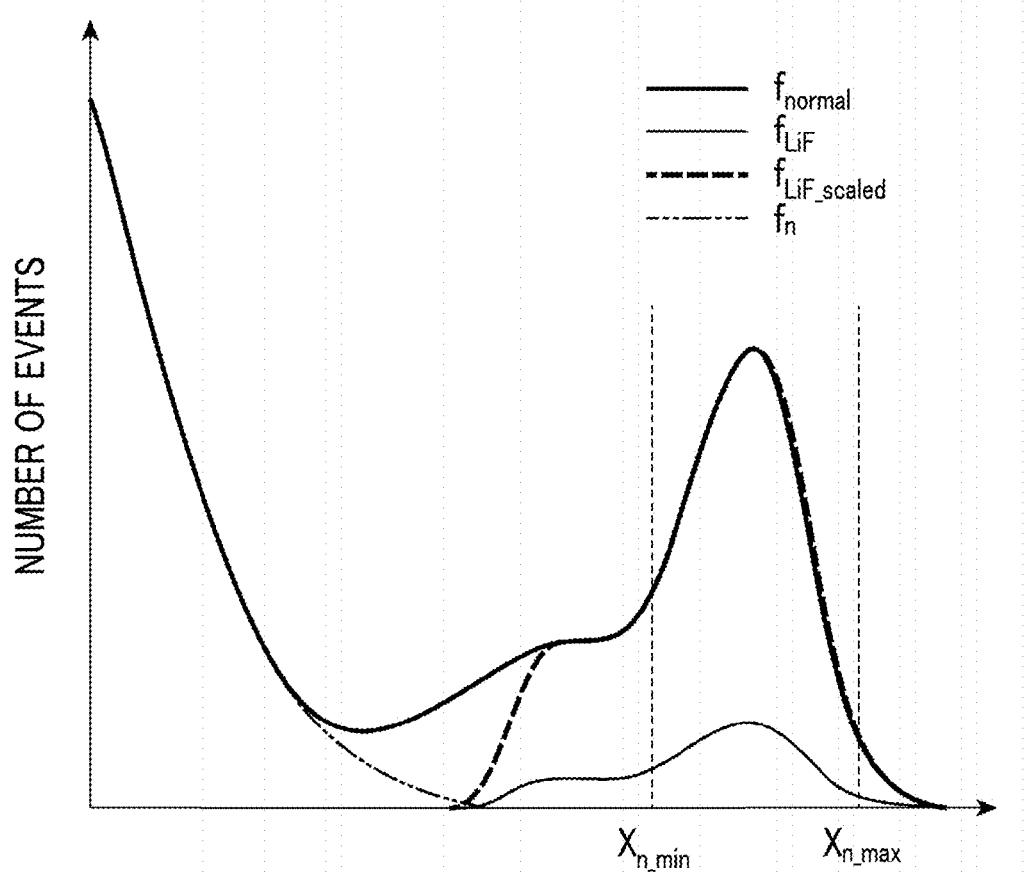
FIG. 6 is a graph illustrating a relationship between wave height distribution and counting used for adjustment of the determination threshold value.

Next, the wave height distribution acquiring unit 42 extracts a region where the neutron rays N are included from the wave height distribution $f_{normal}$ and sets "$x_{n\_min}$ to $x_{n\_max}$" as a range of the wave height of the region (refer to FIG. 6). Next, the wave height distribution acquiring unit 42 defines a formula shown in the following Formula (2), and obtains β (=$β_{opt}$) that minimizes do by iteration. Here, "$f_{n\_scaled}=β_{opt}·f_n$" is defined. Such wave height distribution $f_{n\_scaled}$ is obtained by processing the wave height distribution fn such that the radiation amount of the radiant rays when acquiring the first detection signal matches the radiation amount of the radiant rays when acquiring the second detection signal. Therefore, the wave height distribution acquiring unit 42 obtains a difference between the wave height distribution $f_{normal}$ and the wave height distribution $f_{n\_scaled}$, thereby acquiring gamma ray wave height distribution fγ, which is the wave height distribution of only the gamma rays (refer to FIG. 6).

[Formula 2]

$$d_n = \int_{x_{n\_min}}^{x_{n\_max}} (f_{normal} - β \cdot f_n) dx \quad (2)$$

Next, the determination threshold value adjusting unit 43 adjusts the determination threshold value $Q_{th}$ such that the determination threshold value $Q_{th}$ corresponds to the demanded detection accuracy (Step S80: determination threshold value adjusting process). First, the determination threshold value adjusting unit 43 provisionally calculates the determination threshold value $Q_{th}$ using Formula "$Q_{th}=P_N−aσ$" after the coefficient a is provisionally set to an arbitrary value. Next, the determination threshold value adjusting unit 43 calculates the total number of events having a wave height equal to or greater than the provisional determination threshold value $Q_{th}$ from gamma ray wave height distribution fγ using Formula (3). Accordingly, the number of events of the gamma rays having the wave height equal to or greater than the determination threshold value $Q_{th}$ is calculated (referred to as a first value). The determination threshold value adjusting unit 43 calculates the total number of events having the wave height equal to or greater than the provisional determination threshold value $Q_{th}$ from the wave height distribution $f_{normal}$ using Formula (4) (referred to as a second value). Also, the determination threshold value adjusting unit 43 sets a value obtained by subtracting the first value by the second value as detection accuracy P. Next, the determination threshold value adjusting unit 43 compares the demanded detection accuracy with the calculated detection accuracy P, thereby confirming whether or not the determination threshold value $Q_{th}$ satisfies the user's demanded detection accuracy. In a case where the demanded detection accuracy is not satisfied, the value of the coefficient a is set to another value, and the detection accuracy P using above-described Formulas (3) and (4) is calculated again. The determination threshold value adjusting unit 43 continues such processing until the detection accuracy P coincides with the demanded detection accuracy that is demanded by the user. For example, as illustrated in FIG. 7, the detection accuracy P improves (% decreases) as the value of the coefficient a decreases. Thus, the determination threshold value adjusting unit 43 selects the coefficient a that matches the demanded detection accuracy.

[Formula 3]

$$R_γ = \int_{Q_{th}}^{\infty} f_γ(x) dx \quad (3)$$

[Formula 4]

$$R_{total} = \int_{Q_{th}}^{\infty} f_{normal}(x) dx \quad (4)$$

Next, the determination threshold value adjusting unit 43 displays an optimized determination threshold value $Q_{th}$ in the display unit 31 (Step S90). Additionally, the control unit 20 outputs the optimized determination threshold value $Q_{th}$ to the dose calculating unit 21 (Step S100). From the above, the processing illustrated in FIG. 4 ends.

Next, the working effects of the neutron ray detecting system 100 related to the present embodiment and the method of setting the neutron ray detecting system 100 will be described.

In the neutron ray detecting system 100 related to the present embodiment, in a case where the wave height of the detection signal relating to the received light from the scintillator 13 exceeds the determination threshold value $Q_{th}$, the dose calculating unit 21 that is a discrimination unit discriminates the detection signal from the signal related to the neutron rays N. The determination threshold value setting unit 40 that sets such a determination threshold value $Q_{th}$ includes the detection signal acquiring unit 41 that acquires the first detection signal that is the detection signal of the radiant rays that have entered the scintillator 13 via the filter 51 that cuts the neutron rays N, and the second detection signal that is the detection signal of the radiant rays that have entered the scintillator 13 without the filter 51. Additionally, the determination threshold value setting unit 42 includes the wave height distribution acquiring unit 40 that acquires the neutron ray wave height distribution of the neutron rays N and the gamma ray wave height distribution of only the gamma rays included in the radiant rays on the basis of the difference between the wave height distribution based on the first detection signal and the wave height distribution based on the second detection signal. In this way, by acquiring the neutron ray wave height distribution of the neutron rays N and the gamma ray wave height distribution of only the gamma rays included in the radiant rays, how much gamma rays are detected as noise can be ascertained in a case where a certain determination threshold value $Q_{th}$ is set. That is, a relationship between the determination threshold value $Q_{th}$ and the detection accuracy can be ascertained. Additionally, since the neutron ray wave height distribution and the gamma ray wave height distribution are acquired on the basis of the two measurements in a case where the filter 51 that cuts the neutron rays N is used and in a case where the filter 51 is not used, the relationship between the determination threshold value $Q_{th}$ and the detection accuracy can be accurately ascertained. Therefore, the determination threshold value adjusting unit 43 can adjust a suitable determination threshold value $Q_{th}$ in conformity with the demanded detection accuracy on the basis of the neutron ray wave height distribution and the gamma ray wave height distribution. From the above, the determination threshold value $Q_{th}$ can be set to a suitable value.

In the neutron ray detecting system 100, the determination threshold value setting unit 40 may further include the demanded detection accuracy acquiring unit 44 that acquires the demanded detection accuracy, and the determination threshold value adjusting unit 43 may compare the amount of the gamma rays of which the wave height exceeds the determination threshold value with the detection accuracy acquired by the demanded detection accuracy acquiring unit 44, thereby adjusting the determination threshold value. Accordingly, the determination threshold value adjusting unit 43 can adjust the determination threshold value $Q_{th}$ that matches the detection accuracy demanded from a user.

In the neutron ray detecting system 100, the wave height distribution acquiring unit 42 may acquire the neutron ray wave height distribution and the gamma ray wave height distribution in consideration of the difference between the radiation amount of the radiant rays when acquiring the first detection signal and the radiation amount of the radiant rays when acquiring the second detection signal. In this way, the neutron ray wave height distribution and the gamma ray wave height distribution can be more accurately acquired by taking into consideration the difference in the radiation amounts of the radiant rays between the two measurements in the case where the filter 51 that cuts the neutron rays N is used and in the case where the filter 51 is not used.

Additionally, the method of setting the neutron ray detecting system is a method of setting the neutron ray detecting system 100 that detects the neutron rays N, and the neutron ray detecting system 100 includes the scintillator 13 that generates light when radiant rays enter, the optical fiber 14 that allows the light generated in the scintillator 13 to be transmitted therethrough, and the discrimination unit that receives the light transmitted through the optical fiber 14, and discriminates the detection signal from the signal relating to the neutron rays N in a case where the wave height of the detection signal related to the received light exceeds the determination threshold value $Q_{th}$. The setting method includes the detection signal acquiring process of acquiring the first detection signal that is the detection signal of the radiant rays that have entered the scintillator 13 via the filter 51 that cuts the neutron rays, and the second detection signal that is the detection signal of the radiant rays that have entered the scintillator 13 without the filter 51, the wave height distribution acquiring process of acquiring the neutron ray wave height distribution of only the neutron rays and the gamma ray wave height distribution of only the gamma rays included in the radiant rays on the basis of the difference between the first detection signal and the second detection signal, and the determination threshold value adjusting process of adjusting the determination threshold value on the basis of the neutron ray wave height distribution and the gamma ray wave height distribution.

According to the method of setting the neutron ray detecting system 100, the same working effects as the above-described neutron ray detecting system 100 can be obtained.

Additionally, the neutron ray detecting system 100 is a neutron ray detecting system that detects the neutron rays, and includes the scintillator 13 that generates light when radiant rays enter the scintillator, the optical fiber 14 that allows the light generated in the scintillator 13 to be transmitted therethrough, the discrimination unit that receives the light transmitted through the optical fiber 14, and discriminates the detection signal relating to the received light from the signal relating to the neutron rays N in a case where the wave height of the detection signal exceeds the determination threshold value $Q_{th}$, the display unit 31 that displays information, and the determination threshold value setting unit 40 that sets the determination threshold value $Q_{th}$. The display unit 31 displays the notification for guiding the input of the demanded detection accuracy, and displays the determination threshold value set by the determination threshold value setting unit 40 on the basis of the input detection accuracy.

According to the neutron ray detecting system 100, a user can know the determination threshold value $Q_{th}$, which is set by the determination threshold value setting unit 40 on the basis of the detection accuracy, through the display of the display unit 31, when the detection accuracy is input in accordance with the display of the display unit 31. Accordingly, the user can detect the neutron rays with a suitable determination threshold value according to the demanded detection accuracy.

The invention is not limited to the above-described embodiment.

For example, in the above-described embodiment, a user performs the measurements for acquiring the first detection signal and the second detection signal. Instead of this, all of the respective measurements may be automated. That is, the control unit 20 may automatically perform radiation of radiant rays as soon as the control unit is ready for measurement. In this case, a user may perform replacement of the filter 51. Alternatively, the filter 51 may be provided with a drive unit, and the replacement of the filter 51 may also be automatically performed.

Additionally, in the above-described embodiment, a user performs the measurements for acquiring the first detection signal and the second detection signal. That is, there is a difference in the radiation amount between the respective measurements. Therefore, the processing of matching the radiation amounts with the wave height distributions obtained on the basis of the detection signals is performed. Instead of this, the neutron ray detecting system 100 may further include the irradiation control unit 22 that controls the radiation amount of the radiant rays, and the irradiation control unit 22 may make the radiation amount of the radiant rays when acquiring the first detection signal, and the radiation amount of the radiant rays when acquiring the second detection signal equal to each other. In this way, the neutron ray wave height distribution and the gamma ray wave height distribution can be more accurately acquired by making the radiation amounts of the radiant rays between the two measurements in the case where the filter 51 that cuts the neutron rays N is used and in the case where the filter 51 is not used equal to each other.

Additionally, in the above embodiment, the neutron ray detecting system is applied to the neutron capture therapy apparatus 1. However, the application of the neutron ray detecting system is not limited. For example, the neutron ray detecting system of the invention may be applied as a monitor that monitors the operational state of a nuclear reactor. Additionally, the neutron ray detecting system of the invention may be used when measuring accelerated neutrons to be used for physical experiments. Additionally, the neutron ray detecting system of the invention may be used for a neutron irradiation device for non-destructive inspection.

It should be understood that the invention is not limited to the above-described embodiment, but may be modified into various forms on the basis of the spirit of the invention. Additionally, the modifications are included in the scope of the invention.

What is claimed is:

1. A neutron ray detecting system that detects neutron rays, the system comprising:
   a scintillator that generates light when radiant rays enter the scintillator;
   an optical fiber that allows the light generated in the scintillator to be transmitted therethrough;

a discrimination unit that receives the light transmitted through the optical fiber, and discriminates a detection signal relating to the received light from a signal relating to the neutron rays in a case where a wave height of the detection signal exceeds a determination threshold value; and a determination threshold value setting unit that sets the determination threshold value, wherein the determination threshold value setting unit includes a detection signal acquiring unit that acquires a first detection signal that is the detection signal of the radiant rays that have entered the scintillator via a filter that cuts the neutron rays, and a second detection signal that is the detection signal of the radiant rays that have entered the scintillator without the filter, a wave height distribution acquiring unit that acquires a neutron ray wave height distribution of only the neutron rays and a gamma ray wave height distribution of only the gamma rays included in the radiant ray, on the basis of a difference between a wave height distribution based on the first detection signal, and a wave height distribution based on the second detection signal, and a determination threshold value adjusting unit that adjusts the determination threshold value on the basis of the neutron ray wave height distribution and the gamma ray wave height distribution.

2. The neutron ray detecting system according to claim 1, wherein the determination threshold value setting unit further includes a demanded detection accuracy acquiring unit that acquires a demanded detection accuracy, and wherein the determination threshold value adjusting unit compares an amount of the gamma rays of which a wave height exceeds the determination threshold value with the detection accuracy acquired by the demanded detection accuracy acquiring unit, thereby adjusting the determination threshold value.

3. The neutron ray detecting system according to claim 1, wherein the wave height distribution acquiring unit acquires the neutron ray wave height distribution and the gamma ray wave height distribution in consideration of a difference between a radiation amount of the radiant rays when acquiring the first detection signal and a radiation amount of the radiant rays when acquiring the second detection signal.

4. The neutron ray detecting system according to claim 1, further comprising:

an irradiation control unit that controls a radiation amount of the radiant rays, wherein the irradiation control unit makes a radiation amount of the radiant rays when acquiring the first detection signal, and a radiation amount of the radiant rays when acquiring the second detection signal equal to each other.

5. A method of setting a neutron ray detecting system that detects neutron rays, the system including a scintillator that generates light when radiant rays enter the scintillator, an optical fiber that allows the light generated in the scintillator to be transmitted therethrough, and a discrimination unit that receives the light transmitted through the optical fiber, and discriminates a detection signal relating to the received light from a signal relating to the neutron rays in a case where a wave height of the detection signal exceeds a determination threshold value, the setting method comprising:

a detection signal acquiring process of acquiring a first detection signal that is the detection signal of the radiant rays that have entered the scintillator via a filter that cuts the neutron rays, and a second detection signal that is the detection signal of the radiant rays that have entered the scintillator without the filter;

a wave height distribution acquiring process of acquiring a neutron ray wave height distribution of only the neutron rays and a gamma ray wave height distribution of only the gamma rays included in the radiant rays on the basis of a difference between the first detection signal and the second detection signal; and a determination threshold value adjusting process of adjusting the determination threshold value on the basis of the neutron ray wave height distribution and the gamma ray wave height distribution.

6. A neutron ray detecting system that detects neutron rays, the system comprising: a scintillator that generates light when radiant rays enter the scintillator; an optical fiber that allows the light generated in the scintillator to be transmitted therethrough; a discrimination unit that receives the light transmitted through the optical fiber, and discriminates a detection signal relating to the received light from a signal relating to the neutron rays in a case where a wave height of the detection signal exceeds a determination threshold value; a display unit that displays information; and a determination threshold value setting unit that sets the determination threshold value, wherein the display unit displays a notification for guiding input of a detection accuracy, and displays, after the determination threshold value setting unit sets the determination threshold value on the basis of the input detection accuracy, the set determination threshold value.

* * * * *